United States Patent
Zhao

(10) Patent No.: US 9,720,285 B1
(45) Date of Patent: Aug. 1, 2017

(54) ALIGNMENT METHOD FOR IMPROVING LIGHT TRANSMISSION RATE FOR LIQUID CRYSTAL DISPLAY PANEL

(71) Applicant: Shenzhen China Star Optoelectronics Technology Co., Ltd., Shenzhen (CN)

(72) Inventor: Li Zhao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/120,752

(22) PCT Filed: Jun. 17, 2016

(86) PCT No.: PCT/CN2016/086222
§ 371 (c)(1),
(2) Date: Aug. 23, 2016

(30) Foreign Application Priority Data

Apr. 21, 2016  (CN) .......................... 2016 1 0251606

(51) Int. Cl.
*G02F 1/1343* (2006.01)
*G02F 1/1337* (2006.01)
*G02F 1/1333* (2006.01)

(52) U.S. Cl.
CPC .. *G02F 1/133788* (2013.01); *G02F 1/133753* (2013.01); *G02F 2001/133757* (2013.01)

(58) Field of Classification Search
CPC .............................. G02F 1/1368; G02F 1/1339
See application file for complete search history.

(56) References Cited

U.S. PATENT DOCUMENTS

| 2012/0127457 | A1* | 5/2012 | Hayama ................ G02F 1/1309 356/51 |
| 2014/0227929 | A1* | 8/2014 | Miyachi ............ G02F 1/133788 445/24 |
| 2015/0163968 | A1* | 6/2015 | Lee ................... G02F 1/133707 427/532 |

* cited by examiner

*Primary Examiner* — Joseph L Williams

(57) ABSTRACT

An alignment method for a liquid crystal display panel performs, at the side of a first substrate, an exposing alignment procedure upwardly and downwardly along the long edge of a pixel, the exposing width is an integral multiple of the width of the pixel; and performs, at the side of a second substrate, the exposing alignment procedure leftwardly and rightwardly along the short edge of the pixel, the exposing width is an integral multiple of half of the length of the pixel. By adjusting the exposing width in optical alignment, the alignment method can change the shape of dark line pattern, thereby increasing light transmission rate. Compared to the existing optical alignment approaches, the alignment method can increase the light transmission rate at least up to 16.5%.

13 Claims, 3 Drawing Sheets

FIG. 4 at the side of the first substrate, performing an exposing alignment procedure along a lengthwise direction of a pixel on the first alignment film on the first substrate that corresponds to a column of pixels, the width in each exposure is an integral multiple of the width of the pixel ⟶ S12 at the side of the second substrate, performing the exposing alignment procedure along a widthwise direction of the pixel on the second alignment film on the second substrate that corresponds to a row of pixels, the width in each exposure is an integral multiple of half of the length of the pixel ⟶ S14

FIG. 5

ALIGNMENT METHOD FOR IMPROVING LIGHT TRANSMISSION RATE FOR LIQUID CRYSTAL DISPLAY PANEL

RELATED APPLICATIONS

This application is a National Phase of PCT Patent Application No. PCT/CN2016/086222 having International filing date of Jun. 17, 2016, which claims the benefit of priority of Chinese Patent Application No. 201610251606.1 filed on Apr. 21, 2016. The contents of the above applications are all incorporated by reference as if fully set forth herein in their entirety.

FIELD AND BACKGROUND OF THE INVENTION

The present invention relates to a method for manufacturing a liquid crystal display panel, and more particularly, to an alignment method for a liquid crystal display panel.

In the TFT-LCD manufacture, there are two alignment approaches mainly utilized in liquid crystal molecule alignment, that is, rubbing treatment and optical alignment. The rubbing treatment will cause static electricity and particle pollution. The optical alignment is a noncontact alignment technology, which utilizes linear polarized light to irradiate a light-sensitive polymer alignment film to form a pretilt angle. Relatively speaking, the optical alignment is a better alignment approach.

FIG. 1 is a schematic diagram showing an existing optical alignment approach. As shown in FIG. 1(a), at the side of a thin film transistor array substrate, an exposing alignment procedure is performed upwardly and downwardly along the long edge of a pixel, and the exposing width is a half of the width of the corresponding pixel; as shown in FIG. 1(b), at the side of a color filter substrate, the exposing alignment procedure is performed leftwardly and rightwardly along the short edge of the pixel, and the exposing width is a half of the length of the corresponding pixel. The directions the liquid crystal molecules incline are indicated by the arrows shown in FIG. 1(c). FIG. 1(d) and FIG. 1(e) show a dark line pattern inside a pixel, where FIG. 1(d) is a simulated result without a black matrix and FIG. 1(e) is a simulated result with the black matrix.

The existing optical alignment approach will form a dark line pattern with a shape of  or , called WAN-ZI dark line pattern, in the inner of a pixel, as shown in FIG. 2. The WAN-ZI dark line pattern seriously affects the aperture ratio of the pixel. The aperture ratio has become a bottleneck in the optical alignment technology, especially as with the increasing of pixel density.

Therefore, there is a need to provide an alignment method for a liquid crystal display panel for solving the technical problem of low light transmission rate due to the dark line pattern in the existing alignment approaches.

SUMMARY OF THE INVENTION

The objective of present invention is to provide an alignment method for a liquid crystal display panel for solving the technical problem of low light transmission rate in the existing alignment approaches.

To achieve above objective, an aspect of the present invention provides an alignment method for a liquid crystal display panel, the liquid crystal display panel comprising a first substrate, a second substrate, and a liquid crystal layer deployed between the first substrate and the second substrate, the first substrate and the second substrate respectively having a first alignment film and a second alignment film disposed on inner surfaces thereof for aligning or orienting liquid crystal molecules in the liquid crystal layer, said method comprising the steps of: (a) at the side of the first substrate, performing an exposing alignment procedure along a lengthwise direction of a pixel on the first alignment film on the first substrate that corresponds to a column of pixels, the width in each exposure is substantially equal to the width of the pixel; and (b) at the side of the second substrate, performing the exposing alignment procedure along a widthwise direction of the pixel on the second alignment film on the second substrate that corresponds to a row of pixels, the width in each exposure is substantially equal to a half of the length of the pixel.

Another aspect of the present invention provides an alignment method for a liquid crystal display panel, the liquid crystal display panel comprising a first substrate, a second substrate, and a liquid crystal layer deployed between the first substrate and the second substrate, the first substrate and the second substrate respectively having a first alignment film and a second alignment film disposed on inner surfaces thereof for aligning or orienting liquid crystal molecules in the liquid crystal layer, said method comprising the steps of: (a) at the side of the first substrate, performing an exposing alignment procedure along a lengthwise direction of a pixel on the first alignment film on the first substrate that corresponds to a column of pixels, the width in each exposure is an integral multiple of the width of the pixel; and (b) at the side of the second substrate, performing the exposing alignment procedure along a widthwise direction of the pixel on the second alignment film on the second substrate that corresponds to a row of pixels, the width in each exposure is an integral multiple of half of the length of the pixel.

Still another aspect of the present invention provides an alignment method for a liquid crystal display panel, the liquid crystal display panel comprising a first substrate, a second substrate, and a liquid crystal layer deployed between the first substrate and the second substrate, the first substrate and the second substrate respectively having a first alignment film and a second alignment film disposed on inner surfaces thereof for aligning or orienting liquid crystal molecules in the liquid crystal layer, said method comprising the steps of: (a) at the side of the first substrate, performing an exposing alignment procedure along a longitudinal direction on the first alignment film on the first substrate that corresponds to a first column of pixels; (b) at the side of the first substrate, performing the exposing alignment procedure along a direction opposite to the longitudinal direction on the first alignment film on the first substrate that corresponds to a second column of pixels adjacent to the first column, wherein in Step (a) and Step (b), the width in each exposure is an integral multiple of the width of the pixel; (c) at the side of the second substrate, performing the exposing alignment procedure along a transverse direction on the second alignment film on the second substrate that corresponds to a first row of pixels; and (d) at the side of the second substrate, performing the exposing alignment procedure along a direction opposite to the transverse direction on the second alignment film on the second substrate that corresponds to a second row of pixels adjacent to the first row, wherein in Step (c) and Step (d), the width in each exposure is an integral multiple of half of the length of the pixel. In the alignment method in accordance with an embodiment of the present invention, in Step (a) and Step (b), the width in each exposure is as 1 to 8 times as the width of the pixel; in Step (c) and Step (d), the width in each exposure is as 1 to 8 times as half of the length of the pixel.

The alignment method for a liquid crystal display panel in accordance with the present invention performs, at the side of a first substrate, an exposing alignment procedure upwardly and downwardly along the long edge of a pixel, the exposing width is an integral multiple of the width of the pixel; and performs, at the side of a second substrate, the exposing alignment procedure leftwardly and rightwardly along the short edge of the pixel, the exposing width is an integral multiple of half of the length of the pixel. By adjusting the exposing width in optical alignment, the present invention can change the shape of dark line pattern, thereby increasing light transmission rate. Compared to the existing optical alignment approaches, the alignment method for the liquid crystal display panel in accordance with the present invention can increase the light transmission rate at least up to 16.5%.

To make above content of the present invention more easily understood, it will be described in details by using preferred embodiments in conjunction with the appending drawings.

BRIEF DESCRIPTION OF THE SEVERAL VIEWS OF THE DRAWINGS

FIG. 4 is a schematic diagram showing the structure of a liquid crystal display panel in accordance with the present invention.

FIG. 5 is a flowchart of an alignment method for a liquid crystal display panel in accordance with the present invention.

DESCRIPTION OF SPECIFIC EMBODIMENTS OF THE INVENTION

To make the objectives, technical schemes, and effects of the present invention more clear and specific, the present invention is described in further detail below with reference to the embodiments in accompanying with the appending drawings. It should be understood that the specific embodiments described herein are merely for explaining the present invention, the term "embodiment" used in the context means an example, instance, or illustration, and the present invention is not limited thereto.

Figures 1A, 1B, 1C, 1D, 1E:
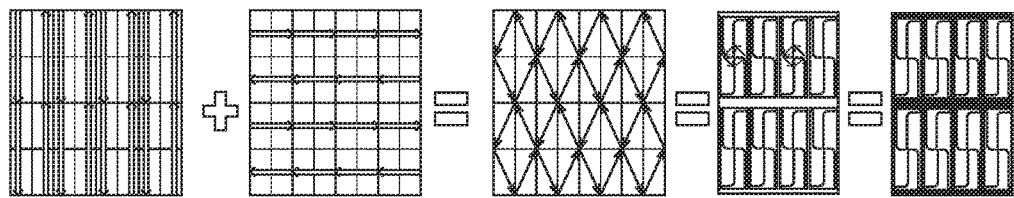
FIG. 1(a), FIG. 1(b), FIG. 1(c), FIG. 1(d) and FIG. 1(e) are a schematic diagram showing an existing optical alignment approach.
Figure 2:
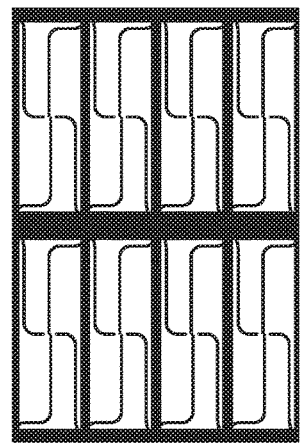
FIG. 2 is a schematic diagram showing a WAN-ZI dark line pattern formed inside a pixel in the existing optical alignment approach.
Figure 3:
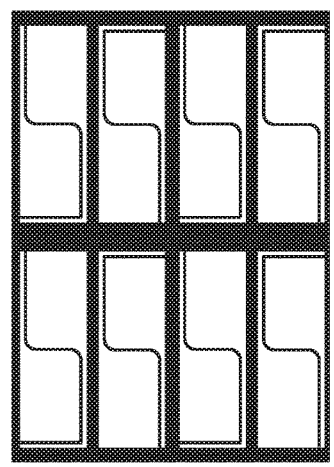
FIG. 3 is a schematic diagram showing a dark line pattern with a shape of ㄣ formed inside a pixel in accordance with an alignment method for a liquid crystal display panel of the present invention.

The present invention provides an alignment method for a liquid crystal display panel, which can change the shape of dark line pattern by adjusting the exposing width in optical alignment so as to reduce the effect on light transmission rate caused by the dark line pattern. In such a manner, the technical problem of low light transmission rate in the existing alignment approaches is solved. As shown in FIG. 3, a dark line pattern with a shape of ㄣ is formed inside the pixel of the present invention. The number of dark lines is apparently decreased in the present invention as compared to the WAN-ZI dark line pattern formed inside the pixel in the existing optical alignment approaches. Therefore, the alignment method for the liquid crystal display panel in accordance with the present invention can dramatically increase the light transmission rate.

First of all, it will be described the structure of a liquid crystal display panel below. Referring to FIG. 4, the liquid crystal display panel includes a first substrate (e.g., a thin film transistor array substrate) 10, a second substrate (e.g., a color filter substrate) 20, and a liquid crystal layer 30 deployed between the first substrate 10 and the second substrate 20. The first substrate 10 has a first alignment film 11 disposed on the inner surface thereof as well as the second substrate 20 has a second alignment film 21 disposed on the inner surface thereof. The first alignment film 11 of the first substrate 10 and the second alignment film 21 of the second substrate 20 are utilized for aligning or orienting liquid crystal molecules in the liquid crystal layer 30 so as to make the liquid crystal molecules oriented along a specified direction at a predetermined pretilt angle, thereby increasing the viewing angle of the display panel.

FIG. 5 is a flow chart of an alignment method for a liquid crystal display panel in accordance with the present invention. FIG. 7 is a schematic diagram showing the steps in the alignment method for the liquid crystal display panel in accordance with the present invention. Referring to FIG. 5 and FIG. 7, the alignment method for the liquid crystal display panel in accordance with the present invention comprises the following steps.

Figures 7A, 7B, 7C, 7D, 7E:
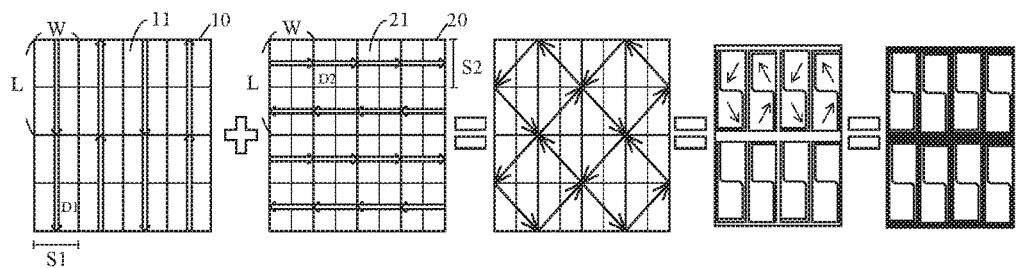
FIG. 7(a), FIG. 7(b), FIG. 7(c), FIG. 7(d) and FIG. 7(e) are a schematic diagram showing the steps in the alignment method for the liquid crystal display panel in accordance with the present invention.

Step S12—referring to FIG. 7(a), at the side of the first substrate 10, performing an exposing alignment procedure along a lengthwise direction D1 of a pixel (the length of the pixel is indicated by the symbol L) on the first alignment film 11 on the first substrate 10 that corresponds to a column of pixels. The width S in each exposure is an integral multiple of the width W of the pixel. For example, in the embodiment illustrated in FIG. 7, the width each time the first alignment film 11 is irradiated is S1 and S1 is equal to the width W of the pixel.

Step S14—referring to FIG. 7(b), at the side of the second substrate 20, performing the exposing alignment procedure along a widthwise direction D2 of the pixel (the width of the pixel is indicated by the symbol W) on the second alignment film 21 on the second substrate 20 that corresponds to a row of pixels. The width S in each exposure is an integral multiple of half of the length L of the pixel. For example, in the embodiment illustrated in FIG. 7, the width each time the second alignment film 21 is irradiated is S2 and S2 is equal to a half of the length L of the pixel.

Step S12 is to manufacture the first alignment film 11 at the side of the first substrate 10; Step 14 is to manufacture the second alignment film 21 at the side of the second substrate 20. In the manufacture of the first alignment film 11 at the side of the first substrate 10, the exposing order in the optical alignment is along the column direction (i.e., the lengthwise direction D1 of the pixel). In the exposing procedure with respect to each column of pixels, the utilized exposing width S is an integral multiple of the width W of the pixel, for example, as 1 to 8 times as the width W of the pixel. Specifically, the exposing width S is equal to the width W of the pixel. In the manufacture of the second alignment film 21 at the side of the second substrate 20, the exposing order in the optical alignment is along the row direction (i.e., the widthwise direction D2 of the pixel). In the exposing procedure with respect to each row of pixels, the utilized exposing width S is an integral multiple of half of the length L of the pixel, for example, as 1 to 8 times as the length L of the pixel. Specifically, the exposing width S is equal to a half of the length L of the pixel. Altering the exposing width S can change the size and shape of dark line pattern, and therefore the light transmission rate is adjustable. The light transmission rate may be thus increased by adopting an appropriate exposing width S.

Figure 6:
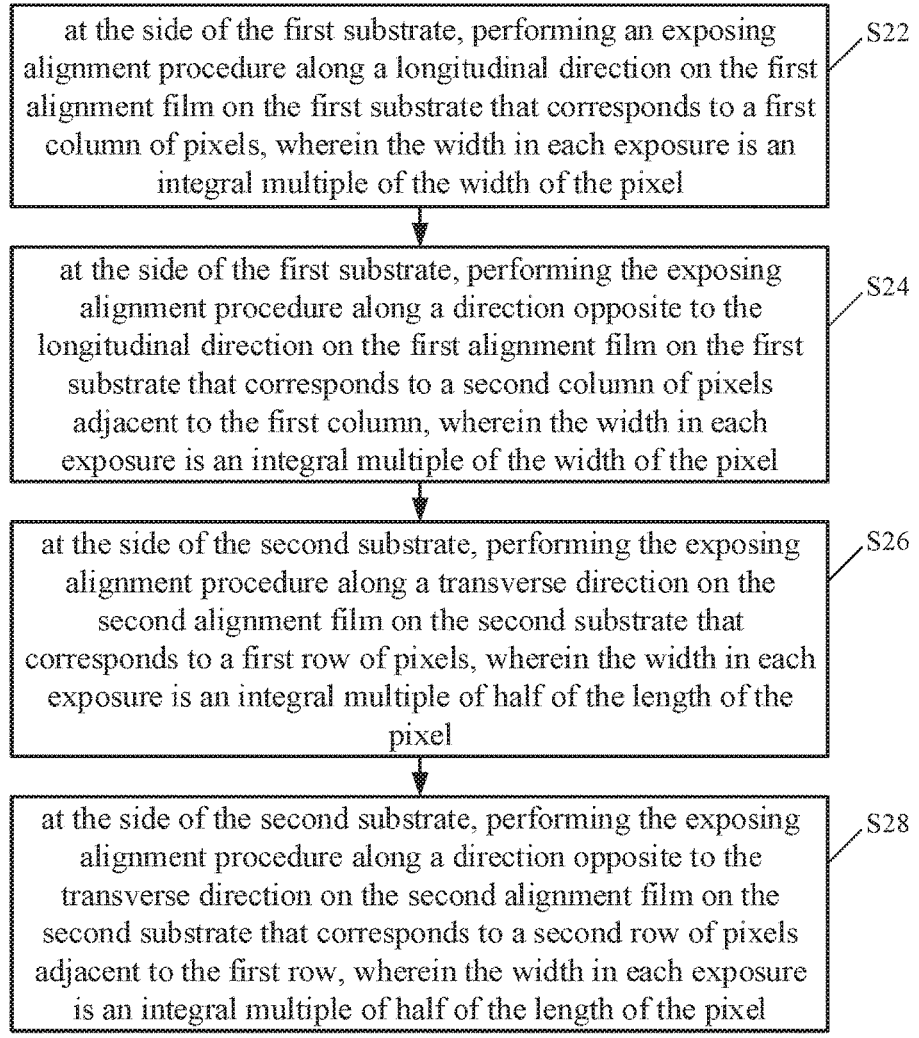
FIG. 6 is a flowchart of an alignment method for a liquid crystal display panel in accordance with an embodiment of the present invention.

In the optical alignment, as one can see, the greater the exposing width is, the higher the light transmission rate can be obtained. However, if the exposing width is too much, the viewing angle of the display panel may be affected. Therefore, the exposing width has to be restricted. Additionally, in one embodiment, the exposing alignment procedure is performed along the lengthwise direction D1 of the pixel in manufacturing the first alignment film 11 at the side of the thin film transistor array substrate 10 and the exposing alignment procedure is performed along the widthwise direction D2 of the pixel in manufacturing the second alignment film 21 at the side of the color filter substrate 20. In another embodiment, the exposing alignment procedure is performed along the widthwise direction D2 of the pixel in manufacturing the first alignment film 11 at the side of the thin film transistor array substrate 10 and the exposing alignment procedure is performed along the lengthwise direction D1 of the pixel in manufacturing the second alignment film 21 at the side of the color filter substrate 20. This is also implementable Referring to FIG. 6 and FIG. 7, the alignment method for the liquid crystal display panel in accordance with other embodiments of the present invention may comprise the following steps.

Step S22—referring to FIG. 7(a), at the side of the first substrate 10, performing an exposing alignment procedure along a longitudinal direction on the first alignment film 11 on the first substrate 10 that corresponds to a first column of pixels.

Step S24—referring to FIG. 7(a), at the side of the first substrate 10, performing the exposing alignment procedure along a direction opposite to the longitudinal direction on the first alignment film 11 on the first substrate 10 that corresponds to a second column of pixels adjacent to the first column, wherein in Step S22 and Step S24, the width S in each exposure is an integral multiple of the width W of the pixel.

Step S22 and Step S24 are to manufacture the first alignment film 11 at the side of the first substrate 10. As shown in FIG. 7(a), the exposing alignment procedure is performed upwardly and downwardly in the optical alignment. That is, with respect to the first alignment film 11 corresponding to the first column of pixels, the exposing alignment procedure is performed along the longitudinal direction (e.g., a downward direction); with respect to the first alignment film 11 corresponding to the second column of pixels adjacent to the first column, the exposing alignment procedure is performed along a direction opposite to the longitudinal direction (e.g., an upward direction). By this way, the entire alignment of the first alignment film 11 is accomplished. The width S in each exposure is an integral multiple of the width W of the pixel. As shown in FIG. 7(a), the width S in each exposure is substantially equal to the width W of the pixel.

Step S26—referring to FIG. 7(b), at the side of the second substrate 20, performing the exposing alignment procedure along a transverse direction on the second alignment film 21 on the second substrate 20 that corresponds to a first row of pixels.

Step S28—referring to FIG. 7(b), at the side of the second substrate 20, performing the exposing alignment procedure along a direction opposite to the transverse direction on the second alignment film 21 on the second substrate 20 that corresponds to a second row of pixels adjacent to the first row, wherein in Step 26 and Step 28, the width S in each exposure is an integral multiple of half of the length L of the pixel.

Step S26 and Step S28 are to manufacture the second alignment film 21 at the side of the second substrate 20. As shown in FIG. 7(b), the exposing alignment procedure is performed leftwardly and rightwardly in the optical alignment. That is, with respect to the second alignment film 21 corresponding to the first row of pixels, the exposing alignment procedure is performed along the transverse direction (e.g., a rightward direction); with respect to the second alignment film 21 corresponding to the second row of pixels adjacent to the first row, the exposing alignment procedure is performed along a direction opposite to the transverse direction (e.g., a leftward direction). By this way, the entire alignment of the second alignment film 21 is accomplished. The width S in each exposure is an integral multiple of half of the length L of the pixel. As shown in FIG. 7(b), the width S in each exposure is substantially equal to a half of the length L of the pixel. That is, one single pixel is performed with two times of transverse exposing alignment.

It is assumed that the width S in each exposure is substantially equal to the width W of the pixel in Step S22 and Step S24 and the width S in each exposure is substantially equal to a half of the length L of the pixel in Step S26 and Step S28. Compared to the existing alignment approaches, the experimental results obtained using the alignment method for the liquid crystal display panel in accordance with the present invention show that the light transmission rate can be increased at least up to 16.5%.

FIG. 7(c) shows the directions the liquid crystal molecules incline due to the first and second alignment films 11 and 21. The overall inclined directions of the liquid crystal molecules are indicated by the arrows shown in FIG. 7(c). The inclined directions of the liquid crystal molecules in one single pixel are indicated by the arrows shown in FIG. 7(d). FIG. 7 (d) also shows a simulated result of dark line pattern inside the pixel without a black matrix while FIG. 7 (e) shows a simulated result of dark line pattern inside the pixel with the black matrix. As can be seen from the simulated results, a dark line pattern with a shape of ㄅ is formed inside the pixel of the present invention and the area occupied by dark lines is not significantly increased. Therefore, the ㄅ shape of dark line pattern in accordance with the present invention improves the light transmission rate as compared to the WAN-ZI dark line pattern in the existing skills.

The alignment method for the liquid crystal display panel in accordance with the present invention performs, at the side of the first substrate 10, the exposing alignment procedure upwardly and downwardly along the long edge L of the pixel (i.e., the lengthwise direction D1), the exposing width S is an integral multiple of the width W of the pixel; and performs, at the side of the second substrate 20, the exposing alignment procedure leftwardly and rightwardly along the short edge W of the pixel (i.e., the widthwise direction D2), the exposing width S is an integral multiple of half of the length L of the pixel. By adjusting the exposing width S in optical alignment, the present invention can change the shape of dark line pattern, thereby increasing the light transmission rate. Compared to the existing optical alignment approaches, the alignment method for the liquid crystal display panel in accordance with the present invention can increase the light transmission rate at least up to 16.5%.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An alignment method for a liquid crystal display panel, the liquid crystal display panel comprising a first substrate, a second substrate, and a liquid crystal layer deployed between the first substrate and the second substrate, the first substrate and the second substrate respectively having a first alignment film and a second alignment film disposed on inner surfaces thereof for aligning or orienting liquid crystal molecules in the liquid crystal layer, said method comprising the steps of:
   (a) at the side of the first substrate, performing an exposing alignment procedure along a lengthwise direction of a pixel on the first alignment film on the first substrate that corresponds to a column of pixels, the width in each exposure is substantially equal to the width of the pixel; and
   (b) at the side of the second substrate, performing the exposing alignment procedure along a widthwise direction of the pixel on the second alignment film on the second substrate that corresponds to a row of pixels, the width in each exposure is substantially equal to a half of the length of the pixel.

2. The method according to claim 1, wherein step (a) further comprises:
   (a1) performing the exposing alignment procedure along a longitudinal direction on the first alignment film corresponding to a first column of pixels; and
   (a2) performing the exposing alignment procedure along a direction opposite to the longitudinal direction on the first alignment film corresponding to a second column of pixels adjacent to the first column.

3. The method according to claim 1, wherein step (b) further comprises:
   (b1) performing the exposing alignment procedure along a transverse direction on the second alignment film corresponding to a first row of pixels; and
   (b2) performing the exposing alignment procedure along a direction opposite to the transverse direction on the second alignment film corresponding to a second row of pixels adjacent to the first row.

4. An alignment method for a liquid crystal display panel, the liquid crystal display panel comprising a first substrate, a second substrate, and a liquid crystal layer deployed between the first substrate and the second substrate, the first substrate and the second substrate respectively having a first alignment film and a second alignment film disposed on inner surfaces thereof for aligning or orienting liquid crystal molecules in the liquid crystal layer, said method comprising the steps of:
   (a) at the side of the first substrate, performing an exposing alignment procedure along a lengthwise direction of a pixel on the first alignment film on the first substrate that corresponds to a column of pixels, the width in each exposure is an integral multiple of the width of the pixel; and
   (b) at the side of the second substrate, performing the exposing alignment procedure along a widthwise direction of the pixel on the second alignment film on the second substrate that corresponds to a row of pixels, the width in each exposure is an integral multiple of half of the length of the pixel.

5. The method according to claim 4, wherein step (a) further comprises:
   (a1) performing the exposing alignment procedure along a longitudinal direction on the first alignment film corresponding to a first column of pixels; and
   (a2) performing the exposing alignment procedure along a direction opposite to the longitudinal direction on the first alignment film corresponding to a second column of pixels adjacent to the first column.

6. The method according to claim 4, wherein step (b) further comprises:
   (b1) performing the exposing alignment procedure along a transverse direction on the second alignment film corresponding to a first row of pixels; and
   (b2) performing the exposing alignment procedure along a direction opposite to the transverse direction on the second alignment film corresponding to a second row of pixels adjacent to the first row.

7. The method according to claim 4, wherein in step (a), the width in each exposure is as 1 to 8 times as the width of the pixel.

8. The method according to claim 4, wherein in step (b), the width in each exposure is as 1 to 8 times as half of the length of the pixel.

9. The method according to claim 4, wherein in step (a), the width in each exposure is substantially equal to the width of the pixel; in step (b), the width in each exposure is substantially equal to a half of the length of the pixel.

10. The method according to claim 4, wherein the first substrate is a thin film transistor array substrate and the second substrate is a color filter substrate.

11. An alignment method for a liquid crystal display panel, the liquid crystal display panel comprising a first substrate, a second substrate, and a liquid crystal layer deployed between the first substrate and the second substrate, the first substrate and the second substrate respectively having a first alignment film and a second alignment film disposed on inner surfaces thereof for aligning or orienting liquid crystal molecules in the liquid crystal layer, said method comprising the steps of:
   (a) at the side of the first substrate, performing an exposing alignment procedure along a longitudinal direction on the first alignment film on the first substrate that corresponds to a first column of pixels;
   (b) at the side of the first substrate, performing the exposing alignment procedure along a direction opposite to the longitudinal direction on the first alignment film on the first substrate that corresponds to a second column of pixels adjacent to the first column, wherein in step (a) and step (b), the width in each exposure is an integral multiple of the width of the pixel;
   (c) at the side of the second substrate, performing the exposing alignment procedure along a transverse direction on the second alignment film on the second substrate that corresponds to a first row of pixels; and (d) at the side of the second substrate, performing the exposing alignment procedure along a direction opposite to the transverse direction on the second alignment film on the second substrate that corresponds to a second row of pixels adjacent to the first row, wherein in step (c) and step (d), the width in each exposure is an integral multiple of half of the length of the pixel.

12. The method according to claim 11, wherein in step (a) and step (b), the width in each exposure is as 1 to 8 times as the width of the pixel; in step (c) and step (d), the width in each exposure is as 1 to 8 times as half of the length of the pixel.

13. The method according to claim 11, wherein in step (a) and step (b), the width in each exposure is substantially equal to the width of the pixel; in step (c) and step (d), the width in each exposure is substantially equal to a half of the length of the pixel.

\* \* \* \* \*